Jan. 18, 1949.  A. HOLLUB  2,459,382
DEMOUNTABLE SEALED STOVE PIPE JOINT
Filed Sept. 14, 1946  2 Sheets-Sheet 1

INVENTOR
ARTHUR HOLLUB
BY John F Brezina
att'y

Jan. 18, 1949.    A. HOLLUB    2,459,382
DEMOUNTABLE SEALED STOVE PIPE JOINT
Filed Sept. 14, 1946    2 Sheets-Sheet 2

INVENTOR
ARTHUR HOLLUB
BY John F. Brezina
Att'y

Patented Jan. 18, 1949

2,459,382

UNITED STATES PATENT OFFICE 2,459,382

DEMOUNTABLE SEALED STOVEPIPE JOINT

Arthur Hollub, Chicago, Ill.

Application September 14, 1946, Serial No. 697,070

6 Claims. (Cl. 285—130)

My invention is directed to novel joints and joint connections for sheet metal pipe and sheet metal tubing.

Presently known joints and methods of connecting sheet metal pipe such as smoke pipe and air conduits principally comprises slipping a crimped end of one pipe section in a smooth surfaced end of another section. This means of connection has various well known disadvantages such as (a) relatively rapid rusting and decay of the overlapped and frictionally engaged portions; (b) sagging and poor support where the span between points of support comprises more than two or three pipe sections with resultant falling of the pipes; (c) the difficult and laborious cleaning of the pipes requiring their complete dismantling, removal and separation; (d) difficult assembly due to friction and inaccessibility at various locations making correct and complete friction assembly virtually impossible; (e) the frequent cost of replacement and labor thereof; and (f) looseness of joints permitting leakage.

It is an object of my invention to provide novel joints and sheet metal pipes containing joints which overcome these disadvantages and which are easily assembled and disassembled either for cleaning or replacement; which provide great strength and provide for long spans of assembled sections without intermediate support; which provide sealed joints at the junctures of pipe sections easily sealable by the average house owner; and which provide a safe and more fireproof channel for smoke and products of combustion.

A further object of my invention is the provision of joints for sheet metal pipes, each of which include a pair of metal ring or reinforcing apertured flange members mounted on adjacent ends of a pair of pipe sections and which flange members are removably secured together by a plurality of bolts, and where the ends of such pipe sections are in abutting relation, though not overlapped, and thereby providing for selective removal of all connecting bolts except two so as to permit a swinging or pivoting of one or more pipe sections out of alignment with the remaining sections which remaining sections need not be removed or dismantled to clean all of said pipe sections.

A further object of my invention is the provision of sealable joints for sheet metal pipes having a separately formed flat band secured circumferentially on the end of one pipe section and having integral angularly bent edge flanges adapted to receive a sealing material, and an annular flange on the adjacent end of the adjacent pipe section whose shape is such as to form, with one of the edge flanges of said band, a circumferential trough in which a mastic sealing compound or cement is placed and retained to effectively seal the joint.

Other and further important objects of my invention will be apparent from the following description and appended claims.

This invention (in an illustrative embodiment) is illustrated and described in the following.

Figure 1:
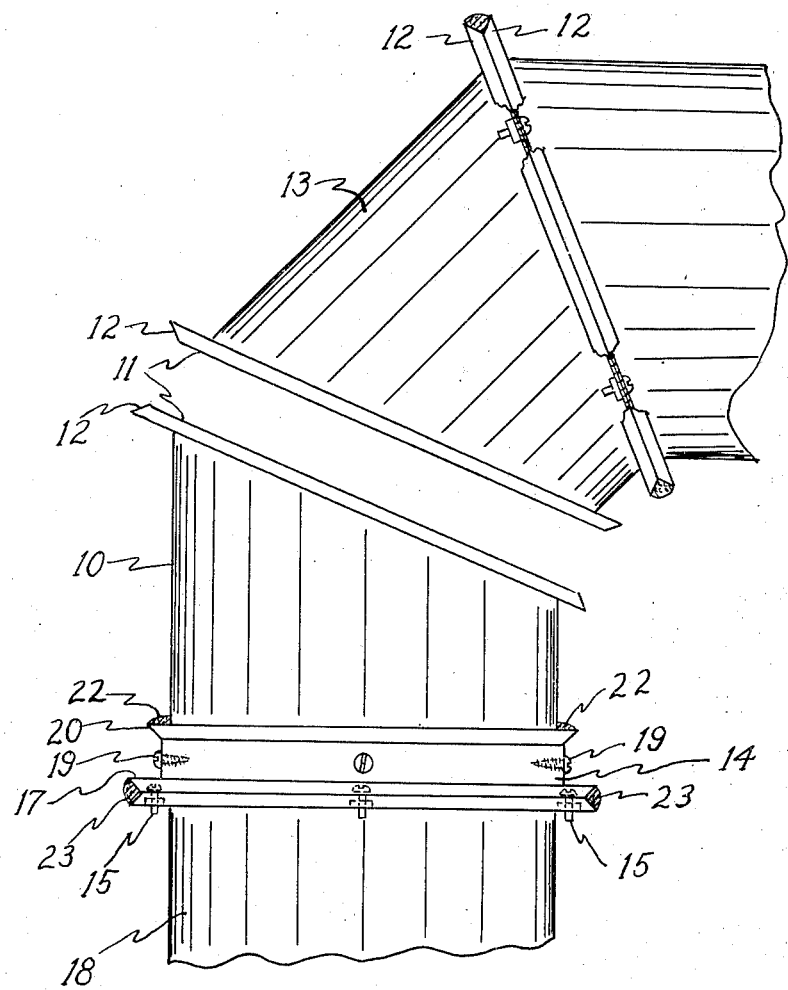
Fig. 1 is an elevational view of an elbow section with two parts thereof separated and with parts broken away.
Figures 2, 3, 4:
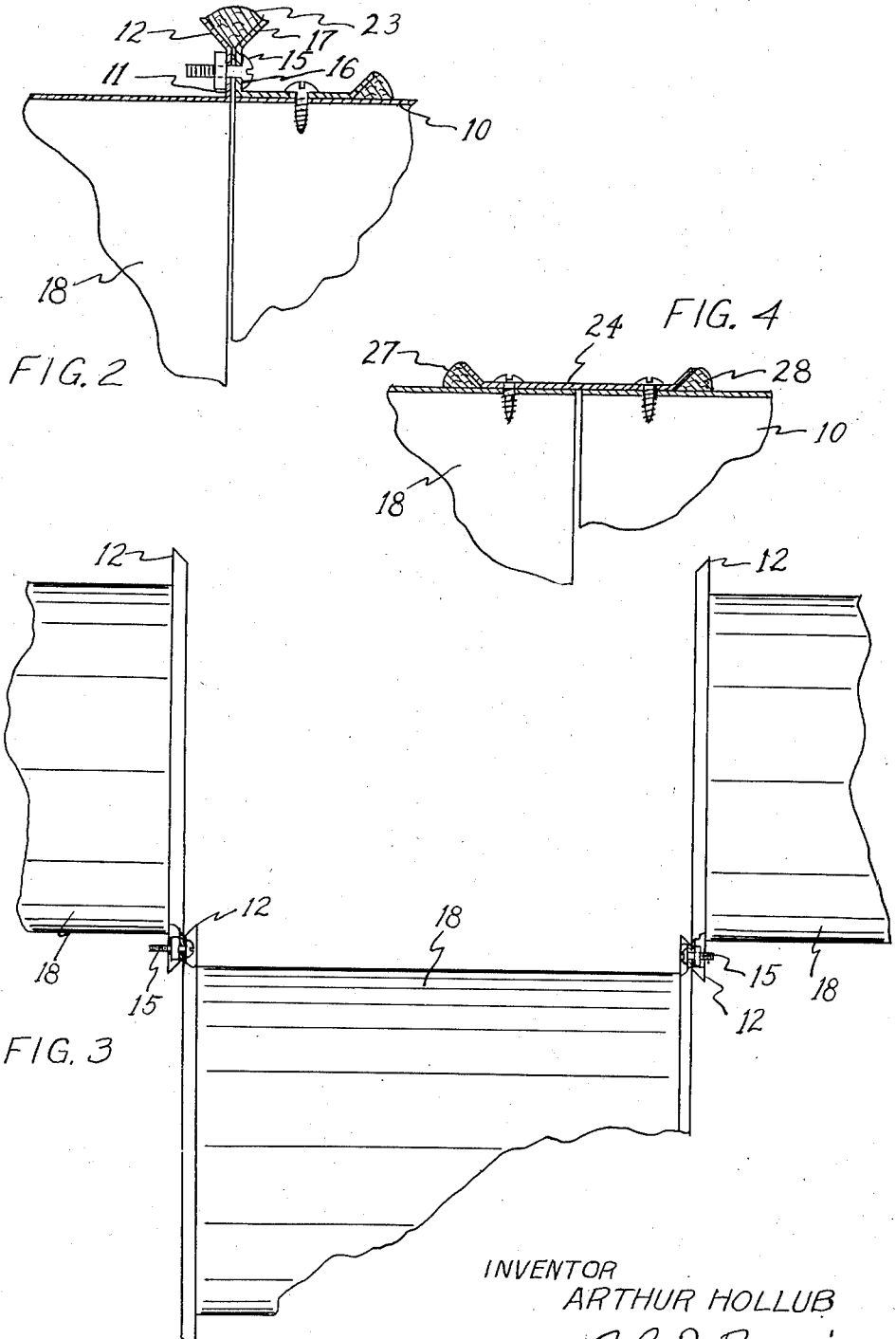
Fig. 2 is a partially cross sectional and partially plan view taken on a plane intersecting one of the connection joints.
Fig. 3 is a plan view showing one pipe section which has been unsecured from between two sections with the exception of one bolt at each end thereof, and pivoted out of alignment to provide access to the group of pipes.
Fig. 4 is a modified embodiment of my invention shown in cross section two sections of pipe secured in end to end relation.

Referring to Figs. 1 and 2, numeral 10 designates a sheet metal pipe section, which may vary in size, length and angular dimension, though which in this illustration is shown as having one end formed at substantially a thirty degree plane and having its separated angular edge bent radially and thence backwardly at an angle to form an integral right angled flange 11 and a continuing angularly bent annular flange 12. The cross section of the separated end portions of pipe sections 10 and 13 is the same as illustrated in the left hand section in Fig. 2, wherein corresponding parts bear similar numerals. The perpendicularly extending flanges 11 have a plurality of spaced holes therein, similar to the one shown in Fig. 2, and said holes are uniformly spaced so that they will register and receive bolts 15 and so that elbow sections may be turned to form different angles of the complete elbow.

Numeral 14 designates a metal band or collar having a perpendicularly and radially extending edge flange 16 which terminates in an angularly bent edge flange 17 which extends outwardly at an angle less than a right angle. Flanges 11 and 16 have a plurality of spaced apart holes therein, one of which is illustrated in Fig. 2 and which receive removable bolts 15. It will be noted that the butt end of pipe section 10 abuts the flanged end of pipe section 18 as shown in Fig. 2.

The collar 14 has a plurality of spaced apart holes therein which register with corresponding holes punched in pipe section 10 and in which are removably mounted sheet metal screws 19 which secure said collar upon its pipe section.

The edge of collar 14 opposite to integral flange 16 is bent or flared outwardly at an angle to form an annular flange 20 which forms a groove or channel with the exterior surface of the pipe section on which said collar is mounted and in which is pressed a mastic sealing compound or cement 22 which will be retained therein and effectively seal the space between the pipe and said collar.

In practice, each straight pipe section has one of the collars 14 mounted on one end thereof and has on its opposite end contiguous annular flanges 11 and 12. By punching the holes in flanges 11 and 16 at uniform distances, such holes may be easily aligned and bolts 15 secured in place, the assembler either adding one section at a time or bolting together a number thereof before mounting them in desired position.

In Fig. 1 I illustrate an elbow composed of three angular pipe sections 10, 13 and 21, the outer two of which each have one end carrying contiguous flanges 11 and 12 and the intermediate section 13 having both ends having said flanges. The cementitious sealing compound or cement is easily applied into the V-shaped groove or channel formed by each pair of adjacently positioned flanges 12 to form a sealing ring 23 shown in cross section in Fig. 1. A similar cementitious sealing ring 23 is formed in the groove between flanges 17 and 12 to thereby prevent any passage of smoke, gases, etc. between any two sections of sheet metal pipe.

As smoke and furnace pipes require frequent cleaning, which with presently used pipes requires complete dismantling and removal of all pipes and remounting thereof, it is an advantage in employing my novel construction to remove all bolts of an intermediate section with exception of two bolts at the lower part thereof and thence rotate such section to permit inspection and access to both such pivoted section and to groups of adjacent pipe sections in the same aligned span. To remount such pivoted section, it is rotated back to original position and the bolts replaced and tightened. Similarly, an elbow may be either completely or partially removed by removal of bolts to permit access in two series of pipes disposed at angles relative to each other.

In normal spans no wires or equivalent supporting means are needed in my construction due to its relatively greater strength and resistance to transverse stresses. In abnormal span lengths, suspension wires may be used and attached to the uppermost of the respective pipes 15. My construction is also satisfactorily adaptable for air conduits, either hot air or air conditioning, and for gas conduits where low pressures prevail.

In Fig. 4 I illustrate a modified embodiment of my invention. Abutting ends of metal pipes 10 and 18 having removably secured thereon a metal band or collar 24, which may be either continuous or split; and which has a plurality of spaced apart holes therein positioned over both pipe sections. Said collar 24 has integral outwardly bent flanges 25 and 26 integral with its opposite edges and which form grooves between the same and pipe sections 18 and 10. Such grooves are filled with a removable mastic cement or equivalent material to form sealing gaskets or rings 27 and 28.

Pipe sections 10 and 18 have holes therein positioned to register with the holes in collar 24 and removable screws 29 are mounted in said holes. Said collar and sealed joint construction provide a strong and effectively sealed joint which is easily removed to permit removal of one or more pipe sections for cleanouts or for replacement.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim:

1. A pipe joint adapted to connect the adjacent ends of two or more pipe sections, an annular flange on one pipe section having a plurality of spaced holes therein; a metal collar having outwardly bent flanges integral with both its edges; said collar being securable on an end of a pipe, one of said collar flanges having spaced holes therein and being bent at an angle to form a V-shaped groove with said first mentioned flange; fastening elements extending through the holes of said flanges; and a removable sealing ring of mastic material in said groove.

2. A pipe joint adapted to connect the adjacent ends of two or more pipe sections, an annular angularly bent flange on one pipe section; a metal collar secured on the other of said pipe sections and having an edge flange bent outwardly and thence angularly over said collar; said flanges providing a groove circumferentially of said joint; bolts extending through the radially extending portions of said flanges; and a gasket removably mounted in said groove and sealing said joint.

3. A pipe joint adapted to connect the adjacent ends of two or more pipe sections, an annular angularly bent flange on one pipe section; a metal collar secured on the other of said pipe sections and having an edge flange bent outwardly and thence angularly over said collar; an integral outwardly bent flange on the other edge of said collar; said first mentioned flanges providing a groove therebetween; said second flange on said collar providing a groove between it and the pipe section; removable fastening elements securing said first mentioned flange and said collar flange together; and removable gaskets mounted in both said grooves.

4. A pipe joint adapted to connect the adjacent ends of two more pipe sections, apertured annular flanges on the adjacent ends of said sections; each of said annular flanges having integral edge flanges extending angularly over said pipe sections respectively and providing a substantially V-shaped groove therebetween; a plurality of removable bolts in said flange apertures; a sealing gasket of mastic material in said groove; the removal of all said bolts except two at opposite ends of a pipe section permitting pivoting of said pipe sections to provide for access to interiors thereof.

5. In an adjustable elbow and pipe connection construction a plurality of pipe sections removably connected together to provide an angular passage; each of said pipe sections having radially and angularly bent integral flanges at their ends, the outer portions of each pair of adjacent flanges forming grooves; removable sealing rings in said grooves respectively, a metal collar removably secured on one end of said elbow; an angular flange integral with one edge of said collar; a pipe section abutting the collar-bearing section; an angular flange integral with the end of said pipe section and forming a groove with said collar flange; a sealing gasket in said last mentioned groove; said pipe section and said elbow sections being separately removable without dismantling of the remaining sections to permit access to the remaining section.

6. In an adjustable, removable and replaceable joint for sheet metal pipes; a pair of sheet metal pipe sections in end abutting position; a metal collar secured on one of said sections; said collar having edge flanges extending over said collar-bearing pipe section; an apertured annular flange on the other of said pipe sections and forming an annular groove with one of said collar flanges; a removable mastic sealing ring in said annular groove; removable bolts securing said collar and said pipe section flange; a sealing ring between the other of said collar flanges and the collar-bearing pipe section; the removal of all bolts of two joints except two aligned bolts permitting a swinging of a pipe section out of alignment to permit access into such pipe sections.

ARTHUR HOLLUB.

REFERENCES CITED

The following references are of record in the file of this patent:

UNITED STATES PATENTS

| Number | Name | Date |
| --- | --- | --- |
| 660,862 | Lovekin | Oct. 30, 1900 |
| 1,155,717 | Fouts | Oct. 5, 1915 |
| 1,853,168 | Murphy | Apr. 12, 1932 |
| 2,169,056 | Place | Aug. 8, 1939 |